US012807814B2

(12) United States Patent
Anderson et al.

(10) Patent No.: US 12,807,814 B2
(45) Date of Patent: *Nov. 24, 2026

(54) NAIL SEALABLE MATERIALS, SYSTEMS, AND METHODS OF MAKING AND INSTALLING THE SAME

(71) Applicant: BMIC LLC, Dallas, TX (US)

(72) Inventors: Eric R. Anderson, Montclair, NJ (US); Walter Zarate, Prospect Park, NJ (US); Li-Ying Yang, Dallas, TX (US)

(73) Assignee: BMIC LLC, Dallas, TX (US)

( * ) Notice: Subject to any disclaimer, the term of this patent is extended or adjusted under 35 U.S.C. 154(b) by 662 days.

This patent is subject to a terminal disclaimer.

(21) Appl. No.: 17/688,526

(22) Filed: Mar. 7, 2022

(65) Prior Publication Data

US 2022/0195194 A1 Jun. 23, 2022

Related U.S. Application Data

(63) Continuation of application No. 17/224,836, filed on Apr. 7, 2021, now Pat. No. 11,267,971.

(60) Provisional application No. 63/008,951, filed on Apr. 13, 2020.

(51) Int. Cl.

*C08L 95/00* (2006.01)
*C08K 3/34* (2006.01)
*C09K 3/10* (2006.01)
*E04D 3/36* (2006.01)

(52) U.S. Cl.

CPC .............. *C08L 95/00* (2013.01); *C08K 3/346* (2013.01); *C09K 3/1006* (2013.01); *E04D 3/3603* (2013.01)

(58) Field of Classification Search

CPC ....... C08L 95/00; C08K 3/346; C08K 3/1006; C09K 3/1006; E04D 3/3603

See application file for complete search history.

(56) References Cited

U.S. PATENT DOCUMENTS

| | | | | |
|---|---|---|---|---|
| 4,787,780 | A * | 11/1988 | Harriett .................... | C09D 5/34 405/270 |
| 6,007,615 | A | 12/1999 | Kato et al. | |
| 6,308,482 | B1 | 10/2001 | Strait | |
| 6,673,432 | B2 | 1/2004 | Kiik et al. | |
| 7,786,028 | B2 | 8/2010 | Souther et al. | |
| 9,309,911 | B1 | 4/2016 | Powell | |
| 9,605,152 | B2 | 3/2017 | Ruan | |
| 9,982,436 | B2 | 5/2018 | Shevlin | |
| 10,696,024 | B2 | 6/2020 | Leatherman et al. | |
| 11,267,971 | B2 * | 3/2022 | Anderson ................. | E04D 5/02 |
| 11,459,761 | B2 | 10/2022 | Ackermann | |
| 2007/0199276 | A1 | 8/2007 | Duque | |
| 2009/0169860 | A1 | 7/2009 | Katsunori et al. | |
| 2011/0083391 | A1 | 4/2011 | Thomas | |
| 2015/0133572 | A1 * | 5/2015 | Yamamoto ........... | C09K 3/1006 521/139 |
| 2015/0197884 | A1 * | 7/2015 | Zhou ....................... | B32B 11/10 428/221 |
| 2016/0348372 | A1 | 12/2016 | Shevlin | |

FOREIGN PATENT DOCUMENTS

| | | | |
|---|---|---|---|
| CN | 102775956 | A | 11/2012 |
| JP | H11 350674 | A | 12/1999 |
| WO | 2014/143780 | A1 | 9/2014 |
| WO | 2017/112756 | A1 | 6/2017 |

* cited by examiner

*Primary Examiner* — Robert S Jones, Jr.
*Assistant Examiner* — Joshua Caleb Bledsoe
(74) *Attorney, Agent, or Firm* — GREENBERG TRAURIG, LLP

(57) ABSTRACT

Nail sealable materials comprising a matrix material and bentonite embedded within the matrix material are described herein in accordance with non-limiting embodiments of the present disclosure. In some embodiments, the nail sealable material comprises a sufficient amount of bentonite, such that the nail sealable material passes ASTM D1970 at a specified nail sealable material test thickness. Some embodiments relate to systems and methods utilizing the nail sealable materials described herein.

19 Claims, 3 Drawing Sheets

NAIL SEALABLE MATERIALS, SYSTEMS, AND METHODS OF MAKING AND INSTALLING THE SAME

CROSS-REFERENCE TO RELATED APPLICATIONS

This application is a continuation of U.S. application Ser. No. 17/224,836, entitled "NAIL SEALABLE MATERIALS, SYSTEMS, AND METHODS OF MAKING AND INSTALLING THE SAME," filed on Apr. 7, 2021, and issuing as U.S. Pat. No. 11,267,971 on Mar. 8, 2022, which claims the benefit of U.S. Provisional Application No. 63/008,951, entitled "NAIL SEALABLE MATERIALS, SYSTEMS, AND METHODS OF MAKING AND INSTALLING THE SAME," filed on Apr. 13, 2020, the entireties of which are hereby incorporated by reference.

FIELD

The present disclosure relates to nail sealable materials, systems, and methods of making the same.

BACKGROUND

Residential and commercial roofing installations may require thousands of penetrations (e.g., nail holes) to fix a weathering material, including but not limited to a roofing membrane, to a roof. Each penetration creates a path for water to pass through the weathering material. This risk of penetration has led to redundancies in installation, such as, but not limited to the duplication of weathering materials. Such redundancies add cost and time to installation and may still fail to contain water.

Moreover, with the rise in the use of photovoltaic panels, such as but not limited to, solar panels in both residential and commercial contexts, protection against water leakage has become even more important, given photovoltaic panels may be sensitive to water damage.

SUMMARY

Some embodiments of the present disclosure relate to a nail sealable material. In some embodiments, the nail sealable material comprises a matrix material and bentonite. In some embodiments, the bentonite is embedded within the matrix material. In some embodiments, the nail sealable material comprises a sufficient amount of the bentonite within the matrix material so as to result in a passing grade when the nail sealable material is tested according to ASTM D1970 at a given nail sealable material test thickness.

Some embodiments of the present disclosure relate to a system comprising the nail sealable material and a building substrate, such as, but not limited to, a roofing substrate. In some embodiments, the nail sealable material is disposed on the at least one surface of the building substrate. In some embodiments, the nail sealable material is affixed to the at least one surface of the building substrate by a plurality of nails. In some embodiments, the system comprises a sufficient amount of bentonite so as to result in a passing grade when the system is tested according to ASTM D1970.

Some embodiments of the present disclosure relate to a method of installing the nail sealable material. In some embodiments the method comprises placing the nail sealable material into contact with at least one surface and driving a plurality of nails through the nail sealable material and through the at least one surface of a building substrate, so as to affix the nail sealable material to the at least one surface of the building substrate. In some embodiments, the nail sealable material comprises a sufficient amount of bentonite, such that after the driving step, the nail sealable material passes ASTM D1970 when tested at a given nail sealable material test thickness.

Some embodiments of the present disclosure relate to a method of manufacturing the nail sealable material. In some embodiments, the method comprises embedding bentonite in a matrix material so as to form a nail sealable material. In some embodiments, a sufficient amount of bentonite is embedded within the matrix material during the embedding step, so as to form a nail sealable material that passes ASTM D1970 when tested at a given nail sealable material test thickness.

In some embodiments, a nail sealable material includes a matrix material. In some embodiments, the matrix material includes asphalt, at least one polymer, or any combination thereof. In some embodiments, the nail sealable material includes bentonite. In some embodiments, the bentonite is embedded within the matrix material. In some embodiments, the nail sealable material includes a sufficient amount of bentonite so as to result in a passing grade when the nail sealable material is tested according to ASTM D1970 at a nail sealable material test thickness of 0.1 inches.

In some embodiments, the asphalt is oxidized asphalt.

In some embodiments, the bentonite is sodium bentonite, potassium bentonite, calcium bentonite, aluminum bentonite or any combination thereof.

In some embodiments, the matrix material is present in the nail sealable material in an amount ranging from 25 wt % to 70 wt % based on a total weight of the nail sealable material.

In some embodiments, the bentonite is present in the nail sealable material an amount ranging from 30 wt % to 75 wt % based on a total weight of the nail sealable material.

In some embodiments, the asphalt is present in the matrix material in an amount ranging from 30 wt % to 100 wt % based on a total weight of the matrix material.

In some embodiments, nail sealable material includes at least one fill material, wherein the at least one fill material is embedded within the matrix material.

In some embodiments, the at least one fill material includes at least one of: limestone, talc, kaolin, alumina trihydrate, magnesium hydroxide, rice hulls, ground tire rubber, or any combination thereof.

In some embodiments, a nail sealable material includes a matrix material. In some embodiments, the matrix material includes asphalt, at least one polymer, or any combination thereof. In some embodiments, the nail sealable material includes bentonite. In some embodiments, the bentonite is embedded within the matrix material. In some embodiments, the nail sealable material includes a sufficient amount of bentonite so as to result in a passing grade when the nail sealable material is tested according to ASTM D1970 at a nail sealable material test thickness of 0.04 inches.

In some embodiments, the at least one polymer includes at least one of: thermoplastic polyolefin (TPO), polyvinyl chloride (PVC), ethylene propylene diene monomer rubber (EPDM), Poly(styrene-butadiene-styrene) (SBS), Atactic Polypropylene (APP), or any combination thereof.

In some embodiments, the combination of asphalt and polymer is polymer modified asphalt.

In some embodiments, the at least one polymer is present in the matrix material in an amount ranging from 5 wt % to 95 wt % based on a total weight of the matrix material.

In some embodiments, a system includes a nail sealable material. In some embodiments, the nail sealable material includes a matrix material. In some embodiments, the matrix material includes asphalt, at least one polymer, or any combination thereof. In some embodiments, the nail sealable material includes bentonite. In some embodiments, the bentonite is embedded within the matrix material. In some embodiments, the system includes a building substrate. In some embodiments, the building substrate has at least one surface. In some embodiments, the nail sealable material is disposed on the at least one surface. In some embodiments, the system includes a plurality of nails. In some embodiments, the nail sealable material is affixed to the at least one surface by the plurality of nails. In some embodiments, the system includes a sufficient amount of bentonite so as to result in a passing grade when the system is tested according to ASTM D1970 at a nail sealable material thickness of 0.1 inches.

In some embodiments, a system includes a nail sealable material. In some embodiments, the nail sealable material includes a matrix material. In some embodiments, the matrix material includes asphalt, at least one polymer, or any combination thereof. In some embodiments, the nail sealable material includes bentonite, wherein the bentonite is embedded within the matrix material. In some embodiments, the system includes a building substrate. In some embodiments, the building substrate has at least one surface. In some embodiments, the nail sealable material is disposed on the at least one surface. In some embodiments, the system includes a plurality of nails. In some embodiments, the nail sealable material is affixed to the at least one surface by the plurality of nails. In some embodiments, the system includes a sufficient amount of bentonite so as to result in a passing grade when the system is tested according to ASTM D1970 at a nail sealable material thickness of 0.04 inches.

In some embodiments, the building substrate is a roof substrate and the at least one surface is at least one surface of the roof substrate.

In some embodiments, the roof substrate is at least one of: a roof deck, at least one shingle, an underlayment, a chimney, a dormer, a skyline, at least one photovoltaic panel, or any combination thereof.

In some embodiments, the building substrate is at least one of: a wallboard, a beam, a floorboard, a foundation, a plinth, a rafter, or any combination thereof.

In some embodiments, a method includes obtaining a nail sealable material. In some embodiments, the nail sealable material includes a matrix material. In some embodiments, the matrix material includes asphalt, at least one polymer, or any combination thereof. In some embodiments, the nail sealable material includes bentonite. In some embodiments, the bentonite is embedded within the matrix material. In some embodiments, the method includes placing the nail sealable material into contact with at least one surface of a building substrate. In some embodiments, the method includes driving a plurality of nails through the nail sealable material and through the at least one surface of the building substrate, so as to affix the nail sealable material to the at least one surface of the building substrate. In some embodiments, the nail sealable material includes a sufficient amount of bentonite, such that after the driving, the nail sealable material passes ASTM D1970 when the nail sealable material is tested at a nail sealable material test thickness of 0.1 inches.

In some embodiments, a method includes obtaining a nail sealable material. In some embodiments, the nail sealable material includes a matrix material. In some embodiments, the matrix material includes asphalt, at least one polymer, or any combination thereof. In some embodiments, the nail sealable material includes bentonite. In some embodiments, the bentonite is embedded within the matrix material. In some embodiments, the method includes placing the nail sealable material into contact with at least one surface of a building substrate. In some embodiments, the method includes driving a plurality of nails through the nail sealable material and through the at least one surface of the building substrate, so as to affix the nail sealable material to the at least one surface of the building substrate. In some embodiments, the nail sealable material includes a sufficient amount of bentonite, such that after the driving, the nail sealable material passes ASTM D1970 when the nail sealable material is tested at a nail sealable material test thickness of 0.1 inches.

In some embodiments, a method includes obtaining a matrix material and bentonite. In some embodiments, the matrix material includes asphalt, at least one polymer, or any combination thereof. In some embodiments, the method includes embedding a sufficient amount of the bentonite within the matrix material, so as to form a nail sealable material that passes ASTM D1970 when the nail sealable material is tested at a nail sealable material test thickness of 0.1 inches.

In some embodiments, a method includes obtaining a matrix material and bentonite. In some embodiments, the matrix material includes asphalt, at least one polymer, or any combination thereof. In some embodiments, the method includes embedding a sufficient amount of the bentonite within the matrix material, so as to form a nail sealable material that passes ASTM D1970 when the nail sealable material is tested at a nail sealable material test thickness of 0.04 inches.

Covered embodiments are defined by the claims, not the above summary. The above summary is a high-level overview of various aspects and introduces some of the concepts that are further described in the Detailed Description section below. The above summary is not intended to identify key or essential features of the claimed subject matter, nor is the summary intended to be used in isolation to determine the scope of the claimed subject matter. The subject matter should be understood by reference to appropriate portions of the entire specification, any or all drawings, and each claim.

DRAWINGS

Figure 1:
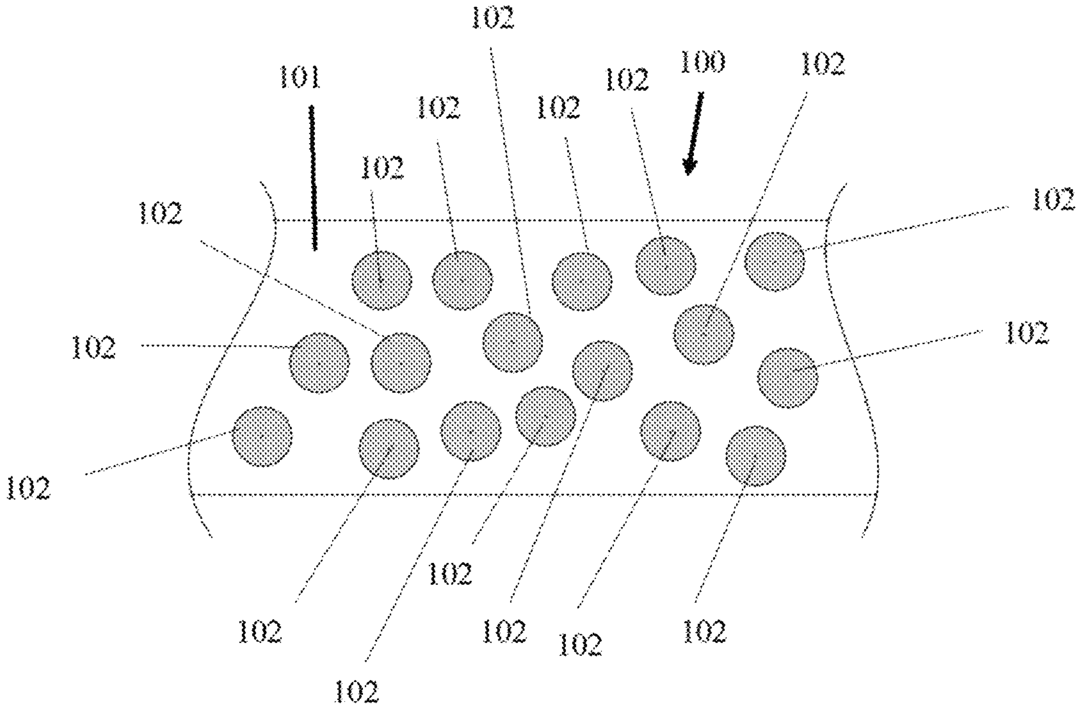
FIG. 1 depicts a non-limiting example of a nail sealable material according to some embodiments of the present disclosure.

Some embodiments of the disclosure are herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

As used herein, a "nail sealable material" is a material that is capable of passing the nail sealability test set forth in ASTM D1970.

As used herein, a "nail sealable material test thickness" is a thickness at which the nail sealable material is tested under ASTM D1970. As described herein, infra, the "nail sealable material test thickness" may or may not be the same as a total thickness of the "nail sealable material."

As used herein, a "matrix material" is a material in which particles of a second material are capable of being embedded.

As used herein, "bentonite" is an expansive clay material comprising at least one phyllosilicate mineral. In some embodiments, the at least one phyllosilicate mineral includes at least one clay having a 2:1 sheet structure, such as, but not limited to, montmorillonite, illite, smectite, vermiculite, or any combination thereof. In some embodiments, bentonite is formed from weathering of volcanic ash in the presence of water. In some embodiments, a species of bentonite may be defined by a predominant cation-exchangeable chemical element that is present in the bentonite. For instance, and by way of example only, if the predominant cation-exchangeable element in the bentonite is sodium, then the bentonite may be characterized as "sodium bentonite."

As used herein, a "fill material" is defined as any material, other than bentonite, that is capable of being embedded within a matrix material.

As used herein, "oxidized asphalt" is defined as a form of processed asphalt that is created by oxidizing asphalt. A non-limiting example of an oxidation procedure is air-blowing, in which air is blown into asphalt at a sufficient temperature (e.g., from 450° F. to 500° F.) to oxidize the asphalt. Other non-limiting examples of oxidation procedures are described in U.S. Pat. Nos. 7,901,563 and 9,556,383, each of which are incorporated by reference in their entireties.

As used herein, "polymer modified asphalt" is defined as a form of processed asphalt that is created by adding at least one polymer to asphalt. A non-limiting example of a polymer modification procedure is emulsification, in which at least one polymer is mixed with asphalt at a sufficient temperature (e.g., from 250° F. to 350° F.) to form an emulsion. Other non-limiting examples of polymer modification procedures are described in U.S. Pat. No. 8,901,211, which is incorporated by reference in its entirety. In yet other embodiments, the polymer forms a colloid suspension, colloid solution, or dispersion with the asphalt.

Some embodiments of the present disclosure relate to a nail sealable material. In some embodiments, the nail sealable material comprises a matrix material and bentonite. In some embodiments, the bentonite is embedded within the matrix material. In some embodiments, the nail sealable material comprises a sufficient amount of the bentonite within the matrix material so as to result in a passing grade when the nail sealable material is tested according to ASTM D1970 at a given nail sealable material test thickness.

FIG. 1 depicts a non-limiting example of a nail sealable material according to the present disclosure. As shown, nail sealable material 100 may include a matrix material 101. In some embodiments, bentonite 102 may be embedded within matrix material 101.

In some embodiments, the matrix material is present in the nail sealable material in an amount ranging from 25 wt % to 70 wt % based on a total weight of the nail sealable material. In some embodiments, the matrix material is present in the nail sealable material in an amount ranging from 35 wt % to 70 wt % based on a total weight of the nail sealable material. In some embodiments, the matrix material is present in the nail sealable material in an amount ranging from 45 wt % to 70 wt % based on a total weight of the nail sealable material. In some embodiments, the matrix material is present in the nail sealable material in an amount ranging from 55 wt % to 70 wt % based on a total weight of the nail sealable material. In some embodiments, the matrix material is present in the nail sealable material in an amount ranging from 65 wt % to 70 wt % based on a total weight of the nail sealable material.

In some embodiments, the matrix material is present in the nail sealable material in an amount ranging from 25 wt % to 65 wt % based on a total weight of the nail sealable material. In some embodiments, the matrix material is present in the nail sealable material in an amount ranging from 25 wt % to 55 wt % based on a total weight of the nail sealable material. In some embodiments, the matrix material is present in the nail sealable material in an amount ranging from 25 wt % to 45 wt % based on a total weight of the nail sealable material. In some embodiments, the matrix material is present in the nail sealable material in an amount ranging from 25 wt % to 35 wt % based on a total weight of the nail sealable material.

In some embodiments, the matrix material is present in the nail sealable material in an amount ranging from 35 wt % to 65 wt % based on a total weight of the nail sealable material. In some embodiments, the matrix material is present in the nail sealable material in an amount ranging from 45 wt % to 55 wt % based on a total weight of the nail sealable material.

In some embodiments, the matrix material of the nail sealable material comprises asphalt, at least one polymer, or any combination thereof. In some embodiments, the asphalt of the nail sealable material, when present, is oxidized asphalt. In some embodiments, the polymer of the nail sealable material, when present, is thermoplastic polyolefin (TPO), polyvinyl chloride (PVC), ethylene propylene diene monomer rubber (EPDM), Poly(styrene-butadiene-styrene) (SBS), Atactic Polypropylene (APP), or any combination thereof. In some embodiments, the combination of asphalt and polymer is polymer modified asphalt. In some embodiments the polymer modified asphalt comprises at least one polymer modifier. In some embodiments, the at least one polymer modifier is SBS or APP.

In some embodiments, the asphalt may be present in the matrix material an amount ranging from 80 wt % to 100 wt % based on a total weight of the matrix material. In some embodiments, the asphalt may be present in the matrix material an amount ranging from 85 wt % to 100 wt % based on a total weight of the matrix material. In some embodiments, the asphalt may be present in the matrix material an amount ranging from 90 wt % to 100 wt % based on a total weight of the matrix material. In some embodiments, the asphalt may be present in the matrix material an amount ranging from 95 wt % to 100 wt % based on a total weight of the matrix material.

In some embodiments, the asphalt may be present in the matrix material an amount ranging from 80 wt % to 95 wt % based on a total weight of the matrix material. In some embodiments, the asphalt may be present in the matrix material an amount ranging from 80 wt % to 90 wt % based on a total weight of the matrix material. In some embodiments, the asphalt may be present in the matrix material an amount ranging from 80 wt % to 85 wt % based on a total weight of the matrix material. In some embodiments, the asphalt may be present in the matrix material an amount ranging from 85 wt % to 95 wt % based on a total weight of the matrix material. In some embodiments, the asphalt may be present in the matrix material an amount ranging from 85 wt % to 90 wt % based on a total weight of the matrix material.

In some embodiments, the at least one polymer is present in the matrix material an amount ranging from 5 wt % to 95 wt % based on a total weight of the matrix material. In some embodiments, the at least one polymer is present in the matrix material an amount ranging from 25 wt % to 95 wt % based on a total weight of the matrix material. In some embodiments, the at least one polymer is present in the matrix material an amount ranging from 50 wt % to 95 wt % based on a total weight of the matrix material. In some embodiments, the at least one polymer is present in the matrix material an amount ranging from 75 wt % to 95 wt % based on a total weight of the matrix material.

In some embodiments, the at least one polymer is present in the matrix material an amount ranging from 5 wt % to 75 wt % based on a total weight of the matrix material. In some embodiments, the at least one polymer is present in the matrix material an amount ranging from 5 wt % to 50 wt % based on a total weight of the matrix material. In some embodiments, the at least one polymer is present in the matrix material an amount ranging from 5 wt % to 25 wt % based on a total weight of the matrix material. In some embodiments, the at least one polymer is present in the matrix material an amount ranging from 25 wt % to 75 wt % based on a total weight of the matrix material. In some embodiments, the at least one polymer is present in the matrix material an amount ranging from 25 wt % to 50 wt % based on a total weight of the matrix material. In some embodiments, the at least one polymer is present in the matrix material an amount ranging from 50 wt % to 75 wt % based on a total weight of the matrix material.

In some embodiments, the bentonite that is embedded in the matrix material of the nail sealable material is sodium bentonite, potassium bentonite, calcium bentonite, aluminum bentonite, or any combination thereof. In some embodiments, the bentonite is embedded within the matrix material of the nail sealable material as a plurality of regions (e.g., clusters). In some embodiments, no portion of the bentonite is present as a layer on any surface of the matrix material of nail sealable material. In some embodiments, all of the bentonite present in the nail sealable material is embedded within the matrix material of the nail sealable material. In some embodiments, bentonite may be embedded within the matrix material of the nail sealable material and bentonite may also be present as a layer on at least one surface of the matrix material of the nail sealable material.

In some embodiments, the nail sealable material comprises a sufficient amount of the bentonite, so as to result in a passing grade when the nail sealable material is tested according to ASTM D1970 at a given nail sealable material test thickness. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 30 wt % to 75 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 40 wt % to 75 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 50 wt % to 75 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 60 wt % to 75 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 70 wt % to 75 wt % based on a total weight of the nail sealable material.

In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 30 wt % to 70 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 30 wt % to 60 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 30 wt % to 50 wt % based on a total weight of the nail sealable material.

In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 30 wt % to 40 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 40 wt % to 70 wt % based on a total weight of the nail sealable material. In some embodiments, the nail sealable material comprises a sufficient amount of the bentonite, so as to result in a passing grade when the nail sealable material is tested according to ASTM D1970 at a given nail sealable material test thickness, wherein the sufficient amount of the bentonite ranges from 50 wt % to 60 wt % based on a total weight of the nail sealable material.

In some embodiments, the sufficient amount of bentonite (i.e., the minimum amount that results in a passing grade under ASTM D1970 at a given nail sealable material test thickness) is equal to the amount of bentonite that is present in the nail sealable material. In some embodiments, the sufficient amount of bentonite is less than the amount of bentonite that is present in the nail sealable material. Put differently, in some embodiments, the nail sealable material may include an amount of bentonite that exceeds a minimum amount of bentonite required to provide a passing nail sealability grade under ASTM D1970 at a given test thickness.

In some embodiments, the bentonite is present in the nail sealable material in an amount ranging from 30 wt % to 75 wt % based on a total weight of the nail sealable material. In some embodiments, the bentonite is present in the nail sealable material in an amount ranging from 40 wt % to 75 wt % based on a total weight of the nail sealable material. In some embodiments, the bentonite is present in the nail sealable material in an amount ranging from 50 wt % to 75 wt % based on a total weight of the nail sealable material. In some embodiments, the bentonite is present in the nail sealable material in an amount ranging from 60 wt % to 75 wt % based on a total weight of the nail sealable material. In some embodiments, the bentonite is present in the nail sealable material in an amount ranging from 70 wt % to 75 wt % based on a total weight of the nail sealable material.

In some embodiments, the bentonite is present in the nail sealable material in an amount ranging from 30 wt % to 70 wt % based on a total weight of the nail sealable material. In some embodiments, the bentonite is present in the nail sealable material in an amount ranging from 40 wt % to 70 wt % based on a total weight of the nail sealable material. In some embodiments, the bentonite is present in the nail sealable material in an amount ranging from 50 wt % to 70 wt % based on a total weight of the nail sealable material. In some embodiments, the bentonite is present in the nail sealable material in an amount ranging from 60 wt % to 70 wt % based on a total weight of the nail sealable material.

In some embodiments, the bentonite is present in the nail sealable material in an amount ranging from 40 wt % to 70 wt % based on a total weight of the nail sealable material. In some embodiments, the bentonite is present in the nail sealable material in an amount ranging from 50 wt % to 60 wt % based on a total weight of the nail sealable material.

In some embodiments, the nail sealable material comprises a sufficient amount of bentonite, so as to result in a passing grade when the nail sealable material is tested according to ASTM D1970 at a nail sealable material test thickness of 0.04 inches. In some embodiments, the nail sealable material comprises a sufficient amount of bentonite, so as to result in a passing grade when the nail sealable material is tested according to ASTM D1970 at a nail sealable material test thickness of 0.05 inches. In some embodiments, the nail sealable material comprises a sufficient amount of bentonite, so as to result in a passing grade when the nail sealable material is tested according to ASTM D1970 at a nail sealable material test thickness of 0.06 inches. In some embodiments, the nail sealable material comprises a sufficient amount of bentonite, so as to result in a passing grade when the nail sealable material is tested according to ASTM D1970 at a nail sealable material test thickness of 0.07 inches. In some embodiments, the nail sealable material comprises a sufficient amount of bentonite, so as to result in a passing grade when the nail sealable material is tested according to ASTM D1970 at a nail sealable material test thickness of 0.08 inches. In some embodiments, the nail sealable material comprises a sufficient amount of bentonite, so as to result in a passing grade when the nail sealable material is tested according to ASTM D1970 at a nail sealable material test thickness of 0.09 inches. In some embodiments, the nail sealable material comprises a sufficient amount of bentonite, so as to result in a passing grade when the nail sealable material is tested according to ASTM D1970 at a nail sealable material test thickness of 0.1 inches. In some embodiments, the nail sealable material comprises a sufficient amount of bentonite, so as to result in a passing grade when the nail sealable material is tested according to ASTM D1970 at a nail sealable material test thickness of 0.11 inches. In some embodiments, the nail sealable material comprises a sufficient amount of bentonite, so as to result in a passing grade when the nail sealable material is tested according to ASTM D1970 at a nail sealable material test thickness of 0.12 inches. In some embodiments, the nail sealable material comprises a sufficient amount of bentonite, so as to result in a passing grade when the nail sealable material is tested according to ASTM D1970 at a nail sealable material test thickness of 0.13 inches. In some embodiments, the nail sealable material comprises a sufficient amount of bentonite, so as to result in a passing grade when the nail sealable material is tested according to ASTM D1970 at a nail sealable material test thickness of 0.14 inches. In some embodiments, the nail sealable material comprises a sufficient amount of bentonite, so as to result in a passing grade when the nail sealable material is tested according to ASTM D1970 at a nail sealable material test thickness of 0.15 inches. In some embodiments, the nail sealable material comprises a sufficient amount of bentonite, so as to result in a passing grade when the nail sealable material is tested according to ASTM D1970 at a nail sealable material test thickness of 0.16 inches. In some embodiments, the nail sealable material comprises a sufficient amount of bentonite, so as to result in a passing grade when the nail sealable material is tested according to ASTM D1970 at a nail sealable material test thickness of 0.17 inches. In some embodiments, the nail sealable material comprises a sufficient amount of bentonite, so as to result in a passing grade when the nail sealable material is tested according to ASTM D1970 at a nail sealable material test thickness of 0.18 inches. In some embodiments, the nail sealable material comprises a sufficient amount of bentonite, so as to result in a passing grade when the nail sealable material is tested according to ASTM D1970 at a nail sealable material test thickness of 0.19 inches. In some embodiments, the nail sealable material comprises a sufficient amount of bentonite, so as to result in a passing grade when the nail sealable material is tested according to ASTM D1970 at a nail sealable material test thickness of 0.2 inches.

In some embodiments a total thickness of the nail sealable material is the same thickness as the test thickness. In some embodiments the total thickness of the nail sealable material is a different thickness than the test thickness. In some embodiments, the total thickness of the nail sealable material is greater than the test thickness. In some of these embodiments, the nail sealable material may be tested at the test thickness, for example, by cutting the nail sealable material into at least two pieces. In some of these embodiments, the nail sealable material may be tested at the test thickness, for example, by cutting the nail sealable material into at least three pieces. In some of these embodiments, the nail sealable material may be tested at the test thickness, for example, by cutting the nail sealable material into at least four pieces. In some of these embodiments, the nail sealable material may be tested at the test thickness, for example, by cutting the nail sealable material into at least five pieces. In some of these embodiments, the nail sealable material may be tested at the test thickness, for example, by cutting the nail sealable material into at least six pieces. In some of these embodiments, the nail sealable material may be tested at the test thickness, for example, by cutting the nail sealable material into at least seven pieces. In some of these embodiments, the nail sealable material may be tested at the test thickness, for example, by cutting the nail sealable material into at least eight pieces. In some of these embodiments, the nail sealable material may be tested at the test thickness, for example, by cutting the nail sealable material into at least nine pieces. In some of these embodiments, the nail sealable material may be tested at the test thickness, for example, by cutting the nail sealable material into at least ten pieces.

In some embodiments, the total thickness of the nail sealable material is less than the test thickness. In some of these embodiments, the nail sealable material may be tested at the test thickness, for example, by stacking at least two nail sealable materials. In some of these embodiments, the nail sealable material may be tested at the test thickness, for example, by stacking at least three nail sealable materials. In some of these embodiments, the nail sealable material may be tested at the test thickness, for example, by stacking at least four nail sealable materials. In some of these embodiments, the nail sealable material may be tested at the test thickness, for example, by stacking at least five nail sealable materials. In some of these embodiments, the nail sealable material may be tested at the test thickness, for example, by stacking at least six nail sealable materials. In some of these embodiments, the nail sealable material may be tested at the test thickness, for example, by stacking at least seven nail sealable materials. In some of these embodiments, the nail sealable material may be tested at the test thickness, for example, by stacking at least eight nail sealable materials. In some of these embodiments, the nail sealable material may be tested at the test thickness, for example, by stacking at least nine nail sealable materials. In some of these embodiments, the nail sealable material may be tested at the test thickness, for example, by stacking at least ten nail sealable materials.

In some embodiments, the total thickness of the nail sealable material is from 0.01 inches to 0.2 inches. In some embodiments, the total thickness of the nail sealable material is from 0.02 inches to 0.2 inches. In some embodiments, the total thickness of the nail sealable material is from 0.04 inches to 0.2 inches. In some embodiments, the total thickness of the nail sealable material is from 0.1 inches to 0.2 inches. In some embodiments, the total thickness of the nail sealable material is from 0.15 inches to 0.2 inches.

In some embodiments, the total thickness of the nail sealable material is from 0.01 inches to 0.15 inches. In some embodiments, the total thickness of the nail sealable material is from 0.01 inches to 0.1 inches. In some embodiments, the total thickness of the nail sealable material is from 0.01 inches to 0.04 inches. In some embodiments, the total thickness of the nail sealable material is from 0.01 inches to 0.02 inches.

In some embodiments, the total thickness of the nail sealable material is from 0.02 inches to 0.15 inches. In some embodiments, the total thickness of the nail sealable material is from 0.04 inches to 0.1 inches.

In some embodiments, the nail sealable material further comprises at least one fill material. In some embodiments, the at least one fill material is embedded within the matrix material. In some embodiments, the at least one fill material is embedded within the matrix material such that the at least one fill material is interspersed with the bentonite. In some embodiments, the at least one fill material is embedded within the matrix material such that the at least one fill material is segregated from the bentonite. In some embodiments the segregated portions of the fill material may take the form of regions (e.g., clusters) of fill material that are spaced apart from regions (e.g., clusters) of bentonite within the matrix material.

In some embodiments, the at least one fill material comprises at least one of: limestone, talc, kaolin, at least one fire retardant, at least one renewable filler, or any combination thereof. In some embodiments, the at least one renewable filler is rice hull, ground tire rubber, or any combination thereof. In some embodiments, the at least one fire retardant is alumina trihydrate, magnesium hydroxide, or any combination thereof.

In some embodiments, the nail sealable material comprises a plurality of fill materials embedded within the matrix material. In some embodiments, each of the plurality of fill materials is interspersed with the other fill materials embedded within the matrix material, interspersed with the bentonite embedded within the matrix material, or any combination thereof. In some embodiments, each of the plurality of fill materials is segregated from the bentonite embedded within the matrix material, segregated (e.g., in the form of clusters) from other fill materials embedded within the matrix material, or any combination thereof.

Some embodiments of the present disclosure relate to a system comprising the nail sealable material and a building substrate. In some embodiments, the nail sealable material is disposed on the at least one surface of the building substrate. In some embodiments, the at least one surface of the building substrate is the upper or lower surface of the building substrate. In some embodiments, the at least one surface of the building substrate is the exposed surface of the building substrate. In some embodiments, the at least one surface of the building substrate is the unexposed surface of the building substrate. In some embodiments, the nail sealable material is affixed to the at least one surface of the building substrate by the plurality of nails. In some embodiments, the system comprises a sufficient amount of bentonite so as to result in a passing grade when the system is tested according to ASTM D1970.

In some embodiments, the building substrate is at least one of: a wallboard, a beam, a floorboard, a foundation, a plinth, a rafter, or any combination thereof.

In some embodiments, the building substrate is a roofing substrate and the at least one surface is at least one surface of the roofing substrate. In some embodiments, the roofing substrate is at least one of: a roof deck, at least one shingle, an underlayment, a chimney, a dormer, a skyline, at least one photovoltaic panel, or any combination thereof.

In some embodiments, the system comprises the nail sealable material disposed on a plurality of surfaces of a building substrate. In some embodiments, the system comprises the nail sealable material disposed on at least two surfaces of a building substrate. In some embodiments, the system comprises the nail sealable material disposed on at least three surfaces of a building substrate. In some embodiments, the system comprises the nail sealable material disposed on at least four surfaces of a building substrate. In some embodiments, the system comprises the nail sealable material disposed on at least five surfaces of a building substrate. In some embodiments, the system comprises the nail sealable material disposed on at least six surfaces of a building substrate. In some embodiments, the system comprises the nail sealable material disposed on at least seven surfaces of a building substrate. In some embodiments, the system comprises the nail sealable material disposed on at least eight surfaces of a building substrate. In some embodiments, the system comprises the nail sealable material disposed on at least nine surfaces of a building substrate. In some embodiments, the system comprises the nail sealable material disposed on at least ten surfaces of a building substrate.

In some embodiments, the system comprises the nail sealable material disposed on a plurality of building substrates. In some embodiments, the system comprises the nail sealable material disposed on at least two building substrates. In some embodiments, the system comprises the nail sealable material disposed on at least three building substrates. In some embodiments, the system comprises the nail sealable material disposed on at least four building substrates. In some embodiments, the system comprises the nail sealable material disposed on at least five building substrates. In some embodiments, the system comprises the nail sealable material disposed on at least six building substrates. In some embodiments, the system comprises the nail sealable material disposed on at least seven building substrates. In some embodiments, the system comprises the nail sealable material disposed on at least eight building substrates. In some embodiments, the system comprises the nail sealable material disposed on at least nine building substrates. In some embodiments, the system comprises the nail sealable material disposed on at least ten building substrates.

In some embodiments, the plurality of nails comprises a common nail, a box nail, a brad nail, a finishing nail, a drywall nail, a flooring nail, a framing nail, or any combination thereof. In some embodiments, the plurality of nails comprises a roofing nail.

In some embodiments, the nail sealable material is affixed to the at least one surface of the building substrate by at least two nails. In some embodiments, the nail sealable material is affixed to the at least one surface of the building substrate by at least three nails. In some embodiments, the nail sealable material is affixed to the at least one surface of the building substrate by at least four nails. In some embodiments, the nail sealable material is affixed to the at least one surface of the building substrate by at least five nails. In some embodiments, the nail sealable material is affixed to the at least one surface of the building substrate by at least six nails. In some embodiments, the nail sealable material is affixed to the at least one surface of the building substrate by at least seven nails. In some embodiments, the nail sealable material is affixed to the at least one surface of the building substrate by at least eight nails. In some embodiments, the nail sealable material is affixed to the at least one surface of the building substrate by at least nine nails. In some embodiments, the nail sealable material is affixed to the at least one surface of the building substrate by at least ten nails.

In some embodiments, each nail has a diameter of 0.05 inches to 0.162 inches. In some embodiments, each nail has a diameter of 0.075 inches to 0.162 inches. In some embodiments, each nail has a diameter of 0.1 inches to 0.162 inches. In some embodiments, each nail has a diameter of 0.125 inches to 0.162 inches. In some embodiments, each nail has a diameter of 0.15 inches to 0.162 inches.

In some embodiments, each nail has a diameter of 0.05 inches to 0.15 inches. In some embodiments, each nail has a diameter of 0.05 inches to 0.125 inches. In some embodiments, each nail has a diameter of 0.05 inches to 0.1 inches. In some embodiments, each nail has a diameter of 0.05 inches to 0.075 inches.

In some embodiments, each nail has a diameter of 0.075 inches to 0.15 inches. In some embodiments, each nail has a diameter of 0.075 inches to 0.1 inches.

In some embodiments, each nail has a length of 0.5 inches to 4 inches. In some embodiments, each nail has a length of 1 inch to 4 inches. In some embodiments, each nail has a length of 2 inches to 4 inches. In some embodiments, each nail has a length of 3 inches to 4 inches.

In some embodiments, each nail has a length of 0.5 inches to 3 inches. In some embodiments, each nail has a length of 0.5 inches to 2 inches. In some embodiments, each nail has a length of 0.5 inches to 1 inch.

In some embodiments, each nail has a length of 1 inch to 4 inches. In some embodiments, each nail has a length of 2 inches to 3 inches.

Some embodiments of the present disclosure relate to a method of installing the nail sealable material. In some embodiments the method comprises placing the nail sealable material into contact with at least one surface of a building substrate. In some embodiments, the method further comprises driving a plurality of nails through the nail sealable material and through the at least one surface of the building substrate, so as to affix the nail sealable material to the at least one surface of the building substrate. In some embodiments, the nail sealable material comprises a sufficient amount of bentonite, such that after the driving step, the nail sealable material passes ASTM D1970 when tested at a given nail sealable material test thickness (e.g., any nail sealable material test thickness described herein). In some embodiments an exemplary method further comprises placing the nail sealable material into contact with at least one surface of any building substrate described herein (such as, but not limited to at least one roofing substrate). In some embodiments, the method further comprises driving the plurality of nails through the nail sealable material and through the at least one surface of the building substrate, so as to affix the nail sealable material to the at least one surface of the building substrate.

In some embodiments, the nail sealable material comprises a sufficient amount of bentonite (according to any embodiment described herein), such that after driving at least two nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least three nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least four nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least five nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least ten nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least twenty-five nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least fifty nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving at least one-hundred nails through the nail sealable material and through the at least one surface of the building substrate, the nail sealable material passes ASTM D1970 when the nail sealable material is tested at a nail sealable material test thickness described herein.

In some embodiments, the nail sealable material comprises a sufficient amount of bentonite (according to any embodiment described herein), such that after driving two to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to fifty nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to twenty-five nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to ten nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to five nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to four nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving two to three nails through the nail sealable material and through the at least one surface of the building substrate, the nail sealable material passes ASTM D1970 when the nail sealable material is tested at a nail sealable material test thickness described herein.

In some embodiments, the nail sealable material comprises a sufficient amount of bentonite (according to any embodiment described herein), such that after driving three to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving four to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving five to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving ten to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving twenty-five to one-hundred nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving fifty to one-hundred nails through the nail sealable material and through the at least one surface of the building substrate, the nail sealable material passes ASTM D1970 when the nail sealable material is tested at a nail sealable material test thickness described herein.

In some embodiments, the nail sealable material comprises a sufficient amount of bentonite (according to any embodiment described herein), such that after driving three to fifty nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving four to twenty-five nails through the nail sealable material and through the at least one surface of the building substrate, the nail sealable material passes ASTM D1970 when the nail sealable material is tested at a nail sealable material test thickness described herein. In some embodiments, the nail sealable material comprises a sufficient amount of bentonite (according to any embodiment described herein), such that after driving five to ten nails through the nail sealable material and through the at least one surface of the building substrate, the nail sealable material passes ASTM D1970 when the nail sealable material is tested at a nail sealable material test thickness described herein.

Some embodiments of the present disclosure relate to a method of manufacturing the nail sealable material. In some embodiments, the method comprises embedding bentonite in a matrix material so as to form a nail sealable material. In some embodiments, a sufficient amount of bentonite is embedded within the matrix material during the embedding step, so as to form a nail sealable material that passes ASTM D1970 when tested at a given nail sealable material test thickness.

In some embodiments, embedding bentonite in the matrix material comprises mixing the matrix material with bentonite. In some embodiments, embedding bentonite in the matrix material comprises mixing the matrix material with bentonite and at least one filler. In some embodiments, the mixing is performed in a mixing tank. In some embodiments, a resulting mixture of the bentonite and the matrix material is pressed to form the nail sealable material. In some embodiments, the pressing to form the nail sealable material is performed by a plurality of rollers (e.g., milling rollers).

In some embodiments, embedding bentonite in the matrix material comprises compounding the matrix material and bentonite. In some embodiments, embedding bentonite in the matrix material comprises compounding the matrix material, bentonite, and at least one filler. In some embodiments, the compounding comprises extruding with an extruder, such as, but not limited to, a twin crew extruder. In some embodiments, the extruder is connected to a slot die. In some embodiments, a compounded or extruded mixture from the extruder is pressed to form the nail sealable material (e.g., with a calendering process).

In some embodiments, manufacturing the nail sealable material may further comprise rolling the nail sealable material into a rolled sheet. In some embodiments, manufacturing the nail sealable material may further comprise cutting (e.g., slitting) the nail sealable material.

Variations, modifications and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. Thus, for example, in each instance herein, any of the terms "comprising," "consisting essentially of" and "consisting of" may be replaced with either of the other two terms, without altering their respective meanings as defined herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, terms such as "comprising" "including," and "having" do not limit the scope of a specific claim to the materials or steps recited by the claim.

As used herein, the term "consisting essentially of" limits the scope of a specific claim to the specified materials or steps and those that do not materially affect the basic and novel characteristic or characteristics of the specific claim. Within the context of present disclosure, an exemplary basic and novel characteristic of a claim reciting "consisting essentially of" may include but, is not limited to, a passing grade under ASTM D1970.

As used herein, terms such as "consisting of" and "composed of" limit the scope of a specific claim to the materials and steps recited by the claim.

All prior patents, publications, and test methods referenced herein are incorporated by reference in their entireties.

EXAMPLES

Example 1

Nail sealable materials according to the present disclosure were tested in accordance with ASTM D1970 ("Standard Specification for Self-Adhering Polymer Modified Bituminous Sheet Materials Used as Steep Roofing Underlayment for Ice Dam Protection.")

An exemplary test procedure was performed using the following steps: At ambient temperature (23.6° C.), a nail sealable material according to the present disclosure was stapled to a piece of plywood. With two pieces of lumber placed underneath the plywood for support, two 32-mm galvanized roofing nails, spaced 25 to 51 mm apart, were driven through the nail sealable material and the plywood, until the nail heads were flush with the surface of the nail sealable material. Pointed ends of the nails were tapped, so as to raise the nail sealable material heads approximately 6 mm off the surface of the nail sealable material. A bottom of a 4-L can was removed and centered bottom side down on the nail sealable material. A 6 mm bead of silicone was applied completely around outside rim of the can to bond the can to the nail sealable material. The silicone was allowed to set for two hours and another bead of the silicone was applied around the inside rim of the can. The silicone was then allowed to cure for twenty-four hours at ambient temperature, the assembly (i.e., the combination of plywood, the nail-sealable material, and the can), were placed atop another 4 liter can, where the other 4 liter can had the lid removed and the bottom intact. The upper can was filled to a depth of 127 mm with distilled water. The entire assembly was placed in a refrigeration unit maintained at 4.6° C. for a period of three days. The top can and plywood were removed from the assembly and any water in the bottom can, on the shanks of the nails, or on the underside of the plywood were noted. Water was poured from the top can and the inside of the top can was blotted dry. The top can was peeled from the nail sealable material and the nails were removed from the nail sealable material. The underside of the nail sealable material was inspected for signs of water. If water was not present, the nail sealable material passed the testing conducted pursuant to ASTM D1970. If water was present, the material failed the testing conducted pursuant to ASTM D1970.

Results for one nail sealable material according to the present disclosure and one comparative material were tested by the above procedure are shown in Table 1 below.

TABLE 1

| Sample ID | Comparative Example 1 | Example 1 |
|---|---|---|
| Grade | FAIL | PASS |
| Thickness | 20 mil (0.02 in) | 40 mil (0.04 in) |
| Bentonite wt % | 50% Sodium Bentonite | 65% Sodium Bentonite |
| Bentonite particle size | <20 mesh (841 micron) | <20 mesh (841 micron) |
| Composition | wt % | wt % |
| TPO Polymers & Blend (Matrix material) | 46 | 31 |
| Colorants | 3 | 3 |
| Stabilizers and processing aids | 1 | 1 |
| Sodium Bentonite | 50 | 65 |

Figure 2A:
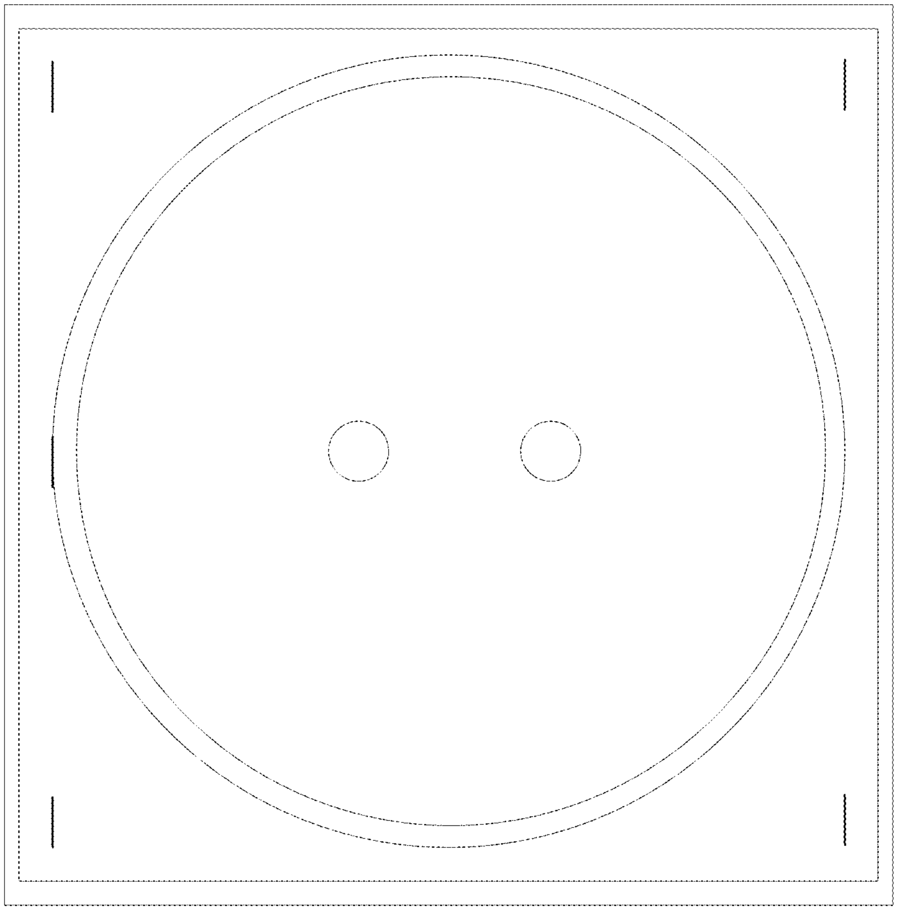
FIG. 2A depicts an exemplary nail sealable material that passed ASTM D1970 in accordance with Example 1 of the present disclosure.
Figure 2B:
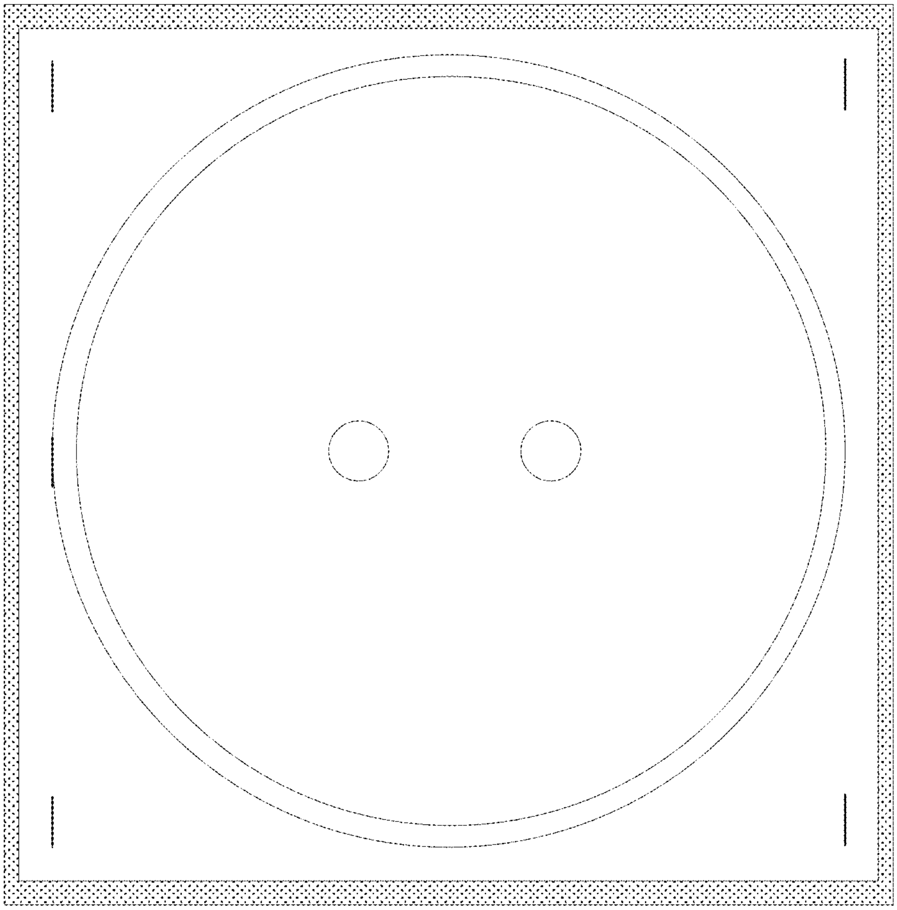
FIG. 2B depicts a comparative nail sealable material that failed ASTM D1970 in accordance with Example 1 of the present disclosure.

An image of the test setup for Example 1, which passed ASTM D1970, is shown in FIG. 2A. An image of the test setup for Comparative Example 1, which failed ASTM D1970, is shown in FIG. 2B.

Example 2

Additional nail sealable materials were tested according to the same procedure as Example 1. Results are shown in Table 2 below.

TABLE 2

| | Comparative Example 2A | Comparative Example 2B | Comparative Example 2C | Example 2 |
|---|---|---|---|---|
| Grade | FAIL | FAIL | FAIL | PASS |
| Thickness | 100 mil (0.1 in) | 100 mil (0.1 in) | 100 mil (0.1 in) | 100 mil (0.1 in) |
| Bentonite wt % | 0 | 5 | 15 | 32.5 |
| Asphalt (matrix material) | 35 | 35 | 35 | 35 |
| Filler | 65 | 60 | 50 | 32.5 |

What is claimed is:

1. A sheet of nail sealable material comprising:

(a) a matrix material, comprising at least one polymer, wherein the at least one polymer comprises at least one of: thermoplastic polyolefin (TPO), polyvinyl chloride (PVC), ethylene propylene diene monomer rubber (EPDM), Poly(styrene-butadiene-styrene) (SBS), Atactic Polypropylene (APP), or any combination thereof; and (b) bentonite, wherein the bentonite is embedded within the matrix material, wherein the bentonite is present in the sheet in an amount ranging from 30 wt % to 75 wt % based on a total weight of the sheet, wherein the sheet optionally includes at least one fire retardant consisting of alumina trihydrate, magnesium hydroxide, or any combination thereof, and wherein the sheet comprises a sufficient amount of bentonite so as to result in a passing grade when the sheet is tested according to ASTM D 1970.

2. The sheet of claim 1, wherein the bentonite is sodium bentonite, potassium bentonite, calcium bentonite, aluminum bentonite or any combination thereof.

3. The sheet of claim 1, wherein the matrix material is present in the sheet in an amount ranging from 25 wt % to 70 wt % based on a total weight of the sheet.

4. The sheet of claim 1, further comprising at least one fill material, wherein the at least one fill material is embedded within the matrix material.

5. The sheet of claim 4, wherein the at least one fill material comprises at least one of: limestone, talc, kaolin, alumina trihydrate, magnesium hydroxide, rice hulls, ground tire rubber, or any combination thereof.

6. The sheet of claim 1, wherein the at least one of: thermoplastic polyolefin (TPO), polyvinyl chloride (PVC), ethylene propylene diene monomer rubber (EPDM), Poly (styrene-butadiene-styrene) (SBS), Atactic Polypropylene (APP), or any combination thereof, is present in the matrix material in an amount ranging from 5 wt % to 95 wt % based on a total weight of the matrix material.

7. The sheet of claim 1, wherein the at least one of: thermoplastic polyolefin (TPO), polyvinyl chloride (PVC), ethylene propylene diene monomer rubber (EPDM), Poly (styrene-butadiene-styrene) (SBS), Atactic Polypropylene (APP), or any combination thereof, is present in the matrix material in an amount ranging from 25 wt % to 75 wt % based on a total weight of the matrix material.

8. The sheet of claim 1, wherein the at least one of: thermoplastic polyolefin (TPO), polyvinyl chloride (PVC), ethylene propylene diene monomer rubber (EPDM), Poly (styrene-butadiene-styrene) (SBS), Atactic Polypropylene (APP), or any combination thereof, is present in the matrix material in an amount ranging from 25 wt % to 50 wt % based on a total weight of the matrix material.

9. A system comprising:

(a) a roof deck having at least one surface;

(b) the sheet of claim 1 disposed on the at least one surface; and (c) a plurality of nails extending through the sheet and affixing the sheet to the at least one surface of the roof deck.

10. The system of claim 9, wherein the sheet has a thickness of 0.04 inches to 0.1 inches.

11. The system of claim 9, wherein all of the bentonite present in the sheet is embedded within the matrix material such that no portion of the bentonite is present as a layer on any surface of the matrix material.

12. A method of manufacturing a sheet of nail sealable material, the method comprising:

embedding bentonite in a matrix material comprising at least one polymer to form a sheet, wherein the sheet optionally includes at least one fire retardant consisting of alumina trihydrate, magnesium hydroxide, or any combination thereof, and wherein the sheet comprises a sufficient amount of bentonite so as to result in a passing grade when the sheet is tested according to ASTM D 1970.

13. The method of claim 12, wherein the at least one polymer comprises at least one of: thermoplastic polyolefin (TPO), polyvinyl chloride (PVC), ethylene propylene diene monomer rubber (EPDM), Poly(styrene-butadiene-styrene) (SBS), Atactic Polypropylene (APP), or any combination thereof.

14. The method of claim 12, wherein the bentonite is present in the sheet in an amount ranging from 30 wt % to 75 wt % based on a total weight of the sheet.

15. The method of claim 12, wherein the sheet has a thickness of from 0.04 inches to 0.1 inches.

16. A method comprising: (a) disposing the sheet of claim 1 on at least one surface of a roof deck; and (b) driving a plurality of nails through the sheet to affix the sheet to the at least one surface of the roof deck.

17. The method of claim 16, wherein the plurality of nails extend through the sheet.

18. The method of claim 16, wherein the sheet has a thickness of from 0.04 inches to 0.1 inches.

19. The method of claim 16, wherein the sheet further comprises at least one fill material embedded within the matrix material.

* * * * *